United States Patent Office 2,720,434
Patented Oct. 11, 1955

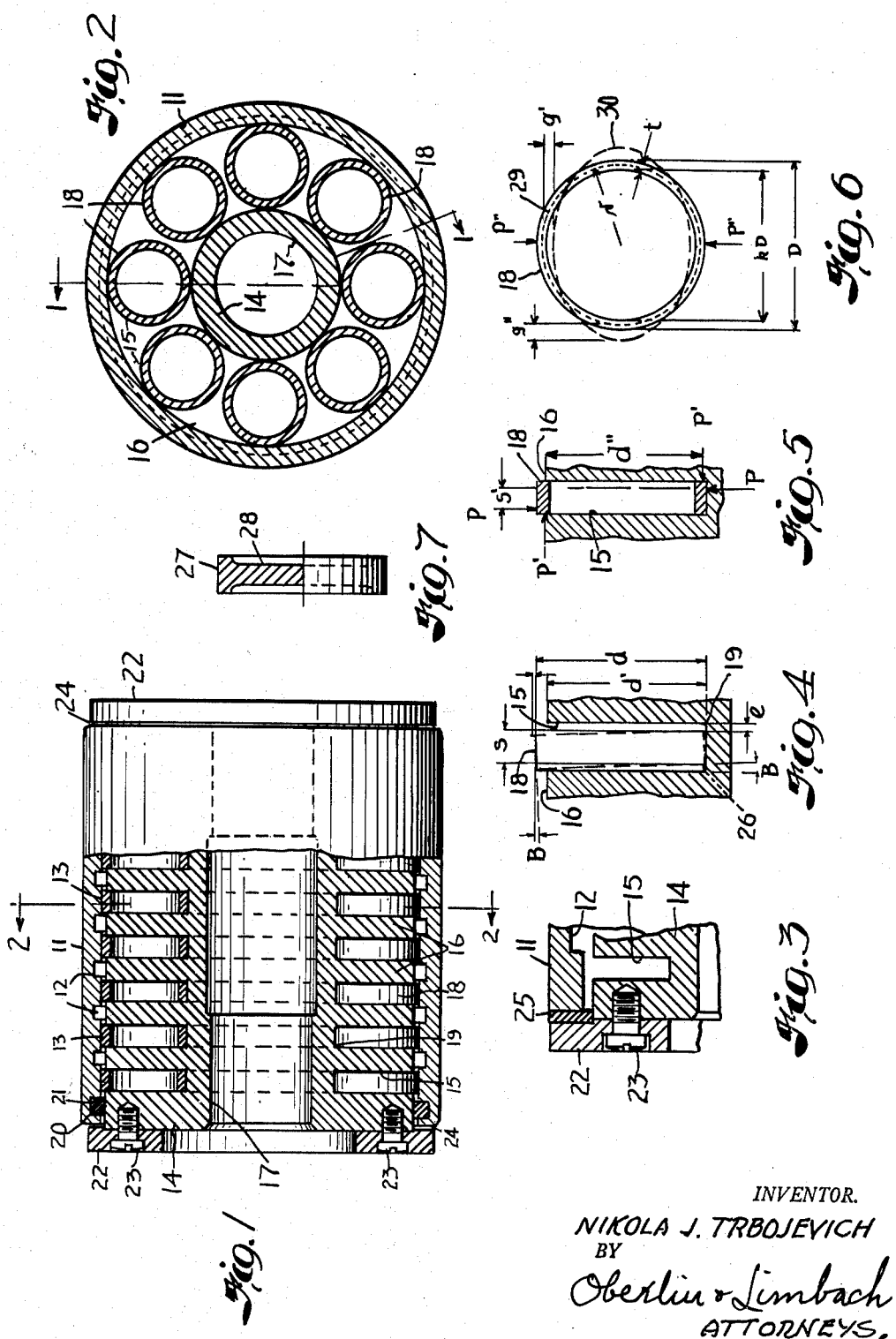

2,720,434

BEARING ASSEMBLY

Nikola J. Trbojevich, Detroit, Mich.

Application September 11, 1953, Serial No. 379,522

12 Claims. (Cl. 308—202)

This invention relates as indicated to bearings and more particularly to an improved anti-friction bearing of the roller type, wherein the harmful effects of corner and other interference, for example due to bending, are eliminated.

It is a principal object of my invention to provide a bearing capable of sustaining violently fluctuating loads and shocks, such for example as encountered in railroad axles, heavy gearing of an indifferent type of workmanship, crankshafts, and the like, without damage thereto.

It is also an object of my invention to provide a bearing having a predetermined amount of flexibility in the rolling members thereof and in the outer race, such that the permissible deflection under load is increased with a consequent reduction of stress.

Another object is to provide a bearing which is economical to produce because wider manufacturing tolerances and cheaper grades of steel than used in present bearing construction may be used in its manufacture.

A further object is to provide a bearing having a considerably greater effective length than has been possible heretofore.

My improved bearing assembly employs races of a novel design such to permit the use of narrow, preferably hollow, rollers without buckling, veering, and skewing thereof in operation. By virtue of such novel races, it is possible to construct a roller-type bearing wherein a plurality of narrow rollers are supported in closely spaced parallel circles with such bearing, in effect, constituting a conglomeration of a great number of individual bearings all cooperating to the extent of carrying a share of the total load but being otherwise independent of each other. When such a bearing assembly is considered as a beam bending under load, only a small portion of the arc of deflection will reflect itself in each individual section thereof. Another advantage of this arrangement results from the fact that the circumferential distribution of the rollers is left to chance wherefore, by the law of averages, even with relatively few rollers in each section, the bearing will act insofar as smoothness of running is concerned, as if it had many more rollers in the circle than it actually has.

Additional objects are provided bearings of various and predetermined "softness" factors and to prevent breakage of the rollers in the case of severe impact. Other objects and advantages will become apparent as the following description proceeds.

To the accomplishment of the foregoing and related ends the invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a side elevation of my new bearing assembly partially shown in longitudinal section as indicated by the line 1—1 in Fig. 2;

Fig. 2 is a transverse section of the assembly taken on the line 2—2 in Fig. 1;

Fig. 3 is a fragmentary section of a slightly modified end closure for the assembly;

Figs. 4, 5 and 6 are geometric diagrams showing the action thereof under certain assumed forces used to determine mathematically the bearing operating characteristics;

Fig. 7 shows a modified roller design in partial section; and

Figure 8:
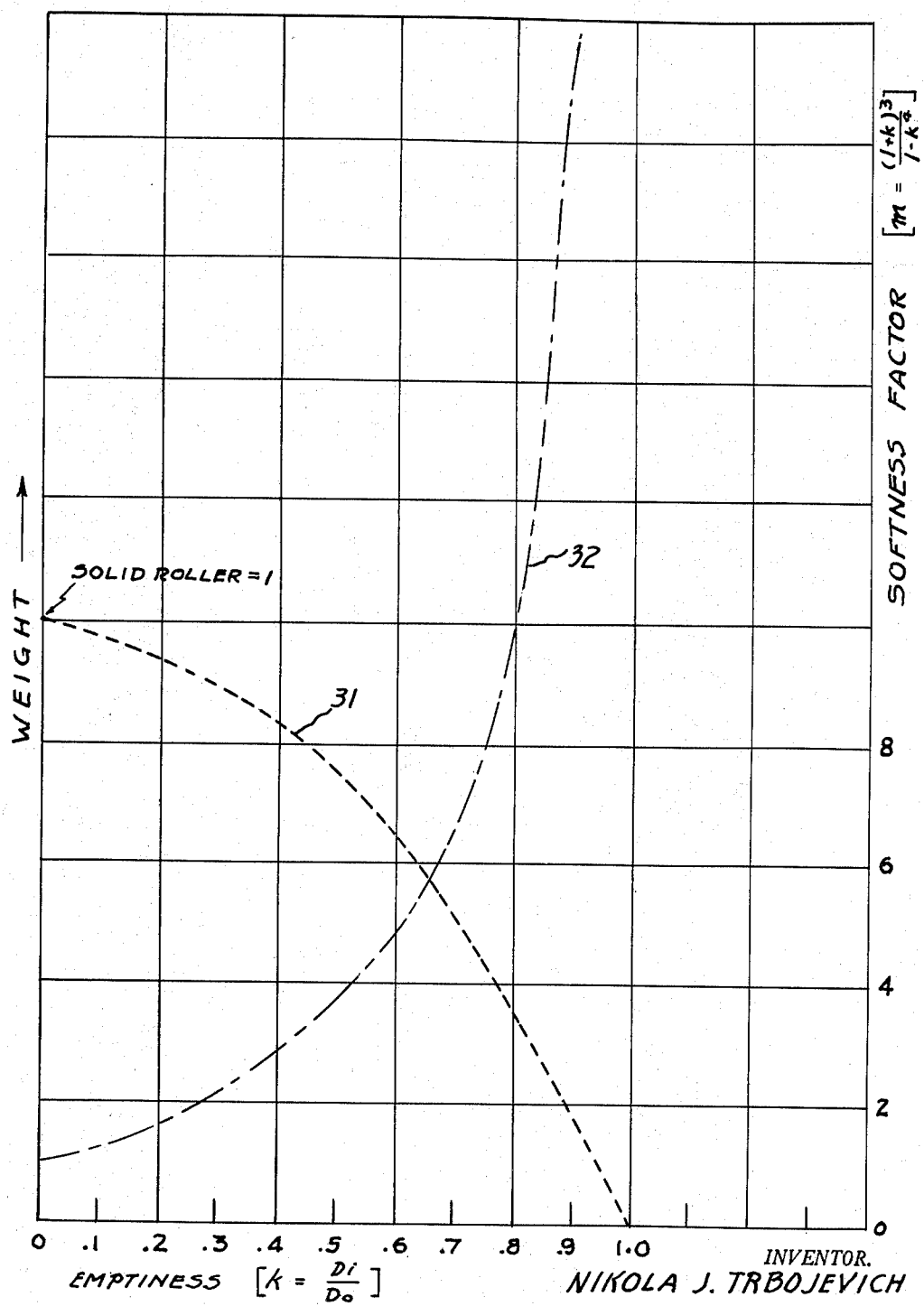
Fig. 8 is a graph showing the relationship between both deflection and weight with respect to hollow roller design, as explained hereinafter.

Referring now to the drawings in detail and especially to Figs. 1 and 2, the bearing assembly illustrated comprises a cylindrical outer shell 11 having serrations in its inner surface forming spaced parallel grooves 12, which are relatively shallow, and intermediate bearing faces 13. Within such shell, coaxial therewith, is an inner drum-like member 14 which is also serrated to provide slots 15 and lands 16 on the outer periphery thereof. It will be noted, however, that the circular parallel slots 15 are of a substantial depth.

The inner member is thus serrated throughout substantially the entire length thereof, and slots 15 are axially offset with respect to the shallow grooves 12 of the outer shell so that the bearing faces 13 are respectively opposed to such slots. Inner member 14 is conventionally provided with an axial bore 17.

Supported within each of the slots 15 is a plurality of narrow hollow rollers 18 arranged circularly in slightly spaced apart relation. The rollers protrude slightly from the slots in which they are respectively housed, beyond the radial extent of the lands 16 and into contact with the cylindrical bearing faces 13 of the outer shell. This slight protrusion of the rollers is of a predetermined extent such that it will not interfere with the outer shell contact under all normal and permitted loads, but will protect the rollers from being crushed or permanently deformed in the case of very severe and accidental impacts. In such instances, the rollers would be merely pushed into the slots due to deformation of the outer shell and the damage, if any, would be confined to the relatively easily reparable lands 16.

While the grooves 12 in the outer shell are not essential to operation of the bearing, they serve as oil grooves and are preferred for this purpose. Due to the centrifugal force developed in operation, such grooves will hold considerable amounts of lubricant.

Experimentation has shown that the grooving of the inner and outer members does not appreciably weaken their untouched cores insofar as bending is concerned. Actually, the weakening effect is only on the order of two to three per cent. This somewhat unusual and fortunate pecularity may be explained by the fact that a plurality of closely spaced slots does not weaken a piece nearly as much as would a single or relatively few slots. The concentration of stress at the corner points 19 of the inner drum grooves may be considered dissolved, since the stress at each such point by-passes the adjacent land 16 and flows to the next corner point, thereby leaving such lands in a stressless state. Small fillets are provided at the corners 19, as shown.

In the Fig. 1 construction, a groove 20 of rectangular cross-section is formed at each end of the outer shell 11 to seat an oil seal 21. End rings 22 are secured by means of cap screws 23 to the respective ends of the inner drum 14, which is of slightly greater length than the outer shell to provide small clearance gaps 24 between the rings and such shell.

A slightly modified form of end closure is shown in Fig. 3. In this construction, a washer 25 of a suitable anti-friction material, such as bronze, is inserted between and in contact with the ends of outer shell 11 and respectively associated end rings 22. This enables the bearing to carry end thrust in either direction in addition to radial load.

The holes or openings of the rollers 18 are concentric with, and preferably of a diameter approximately equal to 75 per cent of, the outside roller diameter. For reasons which will be explained hereinafter, the roller width very seldom exceeds one-fourth the diameter, and, as a general rule, the narrower the rollers the easier they will roll over the races and in the slots. This type of roller is obviously economical with respect to the weight of steel used, and a roller as shown possesses 56 percent more inertia moment per pound of steel than does an equivalent solid roller. Since these rollers are easily manufactured in modern automatic machinery, it is preferred to use a great many of them in each bearing. The bearing assembly shown in Figs. 1 and 2, which has been tested experimentally, has a total of sixty-four rollers, with eight rows of eight rollers each. A gap on the order of one-half to two percent of the roller diameter is provided between the adjacent rollers.

The corner interference $f$ obtaining in a roller of the type, and supported in the manner described will now be determined with reference to Fig. 4. The roller width is there denoted by the letter $s$, the diameter as $d$, and the depth of the slot as $d'$. The width of the slot is a few thousandths of an inch greater than the width of the roller and this gap is shown, greatly exaggerated for convenience, by the letter $e$. It will now be assumed that this roller tilts to the left about its corner fulcrum 26 until it contacts the upper left corner of the slot 15. If the angle of tilt is denoted by B, and the new roller position as shown by the dotted lines, the amount of corner bearing or excess $f$ is easily calculated as follows:

$$\tan B = \frac{e}{d'} \quad (1)$$

and $$f = s \tan B \quad (2)$$

from which, $$f = \frac{se}{d'} \quad (3)$$

Equation 3 indicates that the corner interference may be reduced by the use of narrow rollers of a relatively large diameter. Thus, to cite a numerical example, if $d = 3/4''$, $d' = 23/32''$, $e = .002''$, and $s = .1875''$, the corner interference will be .00052 inch. It will be seen that for such values corner interference in my design is practically non-existent.

With reference now to Fig. 5, the conditions under which a roller confined in a slot will roll will be determined. Actually, as will appear, these conditions are exactly the same as those which brought about the reduction of corner interference as discussed above. If the roller 18 is considered subjected to two oppositely directed radial forces P, offset from each other by the distance $s'$, a couple $Ps'$ will be formed. The roller will be in equilibrium when this couple is opposed by an equivalent couple $P'd''$, wherein $P'$ is the reaction exerted by the side walls of the slot 15. Hence;

$$P' = \frac{Ps'}{d''} \quad (4)$$

in which $d''$ is the diameter of the circle along which the side walls contact the roller. It is to be noted that $P'$ is not necessarily a single force but may be obtained by integrating all the individual forces or pressures acting on the circle $d''$.

If the friction coefficient acting at right angles to the forces P and P' be denoted with F then the tangential force tending to rotate the roller is equal to PF while the force opposing such rotation is equal to P'F, thus, for rotation P must be much greater than P' (5)

and substituting from Equation 5, $$1 \gg \frac{s}{d''} \quad (6)$$

and $$d'' \gg s \quad (7)$$

In other words, the rollers must be so designed that the circle $d''$ along which they contact the slots must have a diameter considerably greater than the width of the roller. As already indicated in the above, I prefer that the width equal approximately one-fourth the roller diameter.

It will be seen that the theory of corner interference and the conditions for rolling contact do not explicitly demand that the rollers should be hollow, but they do require that the rollers have a bearing surface contacting the side walls of the slots at or near their peripheries. It follows, therefore, that if solid rollers are to be used, they must be provided with protruding marginal rims or flanges near the circumference. A solid roller of this nature is shown in Fig. 8 and comprises a reduced central section or web 27 and a marginal rim 28. This type of roller will roll in much the same manner as the hollow roller previously described.

An important feature of my invention is the ability to design bearings graduated in accordance with certain "softness" factors. The manner in which I have derived such factors will now be set forth with reference to Fig. 6. In this figure, there is shown a thin walled roller 18 having a wall thickness $t$, an outside diameter D, an inside or hollow diameter $kD$, and a neutral fiber 29 at the radius $r$. The roller is shown compressed by two oppositely directed radial forces $P''$ producing a deformation of the roller and its neutral fiber into an approximately elliptic form 30. This results in a contraction $g'$ in the direction of the forces $P''$ and a corresponding, somewhat smaller, dilation $g''$ at right angles thereto. In this deformation, the arc length of the neutral fiber 29 remains unchanged, which is a characteristic of the so-called "pure bending."

The respective deformations $g'$ and $g''$ have been calculated by various authorities to be as follows:

$$2g' = .149 \frac{P''r^3}{EI} \quad (8)$$

and $$2g'' = .137 \frac{P''r^3}{EI} \quad (9)$$

in which E is the elastic modulus $3 \times 10^7$ pounds per square inch for steel, and I is the inertia moment about the axis $P''D$. Equations 8 and 9, except for a change in notation, may be found in Roark, "Formulas for Stress and Strain," published by McGraw-Hill Book Company Inc., 1943, at page 152. Equation 9 may be rearranged first by introducing a constant $k$, an emptiness factor, as follows:

$$k = \frac{\text{roller inside diameter}}{\text{roller outside diameter}} \quad (10)$$

The inertia moment I then becomes:

$$I = \frac{\pi}{64} D^4 (1 - k^4) \quad (11)$$

and the neutral fiber $r$ will be:

$$r = \frac{D(1+k)}{4} \quad (12)$$

Substituting in Equation 9:

$$2g' = .149 \frac{P''(1+k)^3}{E\pi D(1-k^4)} \quad (13)$$

This last equation may now be reduced by introducing what I term the "softness" factor $m$:

$$m = \frac{(1+k)^3}{1-k^4} \quad (14)$$

and the final result is therefore:

$$2g' = .0475 \frac{P''m}{ED} \quad (15)$$

This last equation clearly shows that the overall deformation of the roller $2g'$, and similarly $2g''$, is directly proportional to the "softness" factor $m$. The value $m=1$ corresponds to a solid roller for which $k=0$, Equation 10.

In Fig. 8, the weight of a solid roller has for convenience been assumed to be unity, and it will be apparent then that the weight of a hollow roller may be expressed as proportional to $1-k^2$. With a change in $k$, the weight will therefore vary as indicated by the curve 31. The relationship between $k$ and $m$ has also been plotted as the curve 32, and having established this relationship between roller design and "softness," it is therefore possible to provide a series of my bearing assemblies graduated in accordance with the latter factor.

As indicated in the foregoing, I prefer to use a value of $k=.75$, and it will be seen that this corresponds to a "softness" factor of 7.84, that is, my preferred rollers will have 7.84 times greater deflection for the same radial load than would solid rollers of the same diameter. There are, of course, practical limits on the usable range of $k$, and I prefer such range to be on the order of .5 to .75.

While hollow rollers have been used in bearings prior to my invention, there has not, to my knowledge, been any use thereof in accordance with the principles described herein.

Other modes of applying the principle of the invention may be employed, change being made as regards the details described, provided the features stated in any of the following claims, or the equivalent of such, be employed.

I therefore particularly point out and distinctly claim as my invention:

1. In a bearing assembly of the character described, an outer member, an inner member having a circumferential slot formed in its outer peripheral surface, the side walls of such slot lying in parallel radial planes, and a plurality of rollers rotatably supported in such slot in contact both with the bottom thereof and with said outer member, each such roller having a circumferential bearing surface and plane side bearing surfaces adjacent thereto, the latter surfaces being of ring form and adapted to contact the side walls of such slot, the roller width being less than one-half the diameter thereof.

2. In a bearing assembly of the character described, an outer member, an inner member having a circumferential slot formed in its outer peripheral surface, the side walls of such slot lying in parallel radial planes, and a plurality of rollers rotatably supported in such slot in contact both with the bottom thereof and with said outer member, each such roller having a circumferential bearing surface and plane side bearing surfaces adjacent thereto, the latter surfaces being of ring form and adapted to contact the side walls of such slot, the roller diameter being slightly greater than the depth of such slot, whereby said rollers will protrude slightly from the latter, and at least twice the roller width.

3. In a bearing assembly of the character described, an outer member, an inner member having a circumferential slot formed in its outer peripheral surface, the side walls of such slot lying in parallel radial planes, and a plurality of hollow rollers rotatably supported in such slot in contact both with the bottom thereof and with said outer member, each roller having a circumferential bearing surface and plane side bearing surfaces adjacent thereto, the latter surfaces being of ring form and adapted to contact the side walls of such slot, the rollers protruding slightly from such slot and being so dimensioned that the width thereof is less than one-half the outside diameter while such diameter is less than twice the inside diameter.

4. In a bearing assembly of the character described, in combination, an outer member having its inner surface serrated to form shallow grooves and intermediate bearing faces, an inner member having serrations forming relatively deep grooves in its outer periphery, and a plurality of rollers in each groove of said inner member, the respective serrations of the inner and outer member being offset so that the grooves of the former are opposed to the bearing faces of the latter, said rollers protruding slightly from the grooves of the inner member into contact with such bearing faces.

5. A bearing assembly comprising an outer member, an inner member having parallel circumferential grooves of uniform substantial depth in the outer periphery thereof, the side walls of such grooves lying in radial planes and a plurality of rollers rotatably supported in each such groove and protruding slightly therefrom, each such roller having a circumferential bearing surface in contact with said outer member and the bottom of the groove in which it is supported, said rollers further having plane side bearing surfaces of ring form adjacent such circumferential bearing surfaces and adapted to contact the side walls of the respectively associated grooves, the roller width being less than one-half the diameter thereof.

6. A bearing assembly as recited in claim 5 in which the grooves of the inner member are relatively narrow and extend substantially the entire operative length thereof.

7. A bearing assembly as recited in claim 5 in which the inner surface of said outer member is cylindrical and serrated to form shallow grooves and intermediate bearing faces, such shallow grooves being adapted to contain a lubricant.

8. A bearing assembly as recited in claim 5 in which said rollers are provided with concentric holes of a diameter greater than one-half the outside roller diameter.

9. A bearing assembly as recited in claim 5 in which said rollers are provided with concentric holes of a diameter approximately equal to three-fourths the outside roller diameter.

10. A bearing assembly as recited in claim 5 in which the width of said rollers is approximately equal to one-fourth the roller diameter.

11. A bearing assembly as recited in claim 5 in which said rollers are of pulley form comprising peripheral rims and reduced central sections.

12. A bearing assembly as recited in claim 5 in which said rollers are provided with concentric holes of a diameter approximately equal to three-fourths the outside roller diameter and the width of said rollers is approximately equal to one-fourth the diameter thereof.

References Cited in the file of this patent

UNITED STATES PATENTS

| Number | Name | Date |
|---|---|---|
| 897,063 | Cooksey | Aug. 25, 1908 |
| 1,572,725 | Keller | Feb. 9, 1926 |
| 1,961,134 | Buckwalter | June 5, 1934 |